United States Patent

Bugatti

Patent Number: 5,252,286
Date of Patent: Oct. 12, 1993

[54] CLOSING UNIT FOR A DOUBLE TOGGLE MOLDING APPARATUS AND METHOD

[75] Inventor: Egidio Bugatti, Brescia, Italy

[73] Assignee: B.M.B. S.p.A., Brescia, Italy

[21] Appl. No.: 828,389

[22] Filed: Jan. 30, 1992

[30] Foreign Application Priority Data

Apr. 22, 1991 [IT] Italy .................. BS/91/A/000043

[51] Int. Cl.$^5$ .................................................. B29C 45/66
[52] U.S. Cl. ................... 264/328.1; 425/451.6; 425/593
[58] Field of Search ............. 425/450.1, 451.5, 451.6, 425/589, 592, 593; 264/328.1

[56] References Cited
U.S. PATENT DOCUMENTS 4,088,432  5/1978  Farrell .......................... 425/451.6

*Primary Examiner*—Tim Heitbrink
*Attorney, Agent, or Firm*—McGlew and Tuttle

[57] ABSTRACT

A machine for molding is equipped with a toggle mechanism for moving one of the die-holders. The movable die holder slides on columns. The columns are attached at one end to a stationary die-holder and at another end to a closing plate. The toggle mechanism is preferably a double toggle and connects the closing plate to the movable die-holder. A control ring also slides on the columns and is connected to the toggle mechanism by connecting rods. A hydraulic actuator is used to apply force to the movable die-holder to move it towards and away from the stationary die-holder. The control ring and the connecting rods are designed so that the toggle mechanism extends outside the columns during movement of the movable die-holder away from the stationary die-holder.

17 Claims, 4 Drawing Sheets

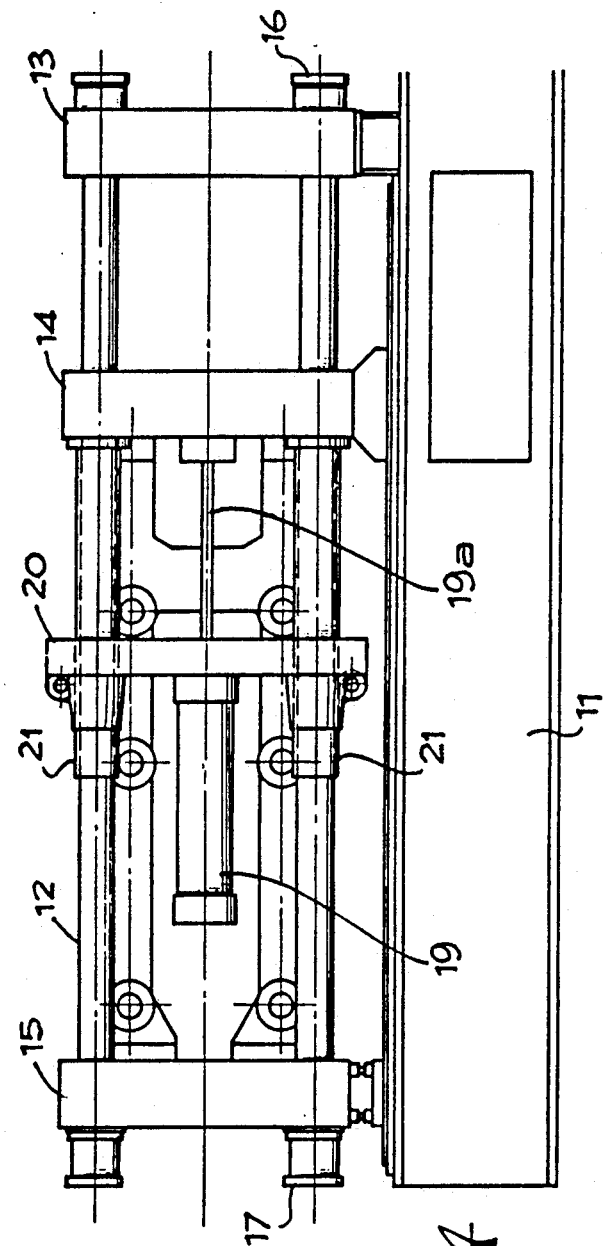
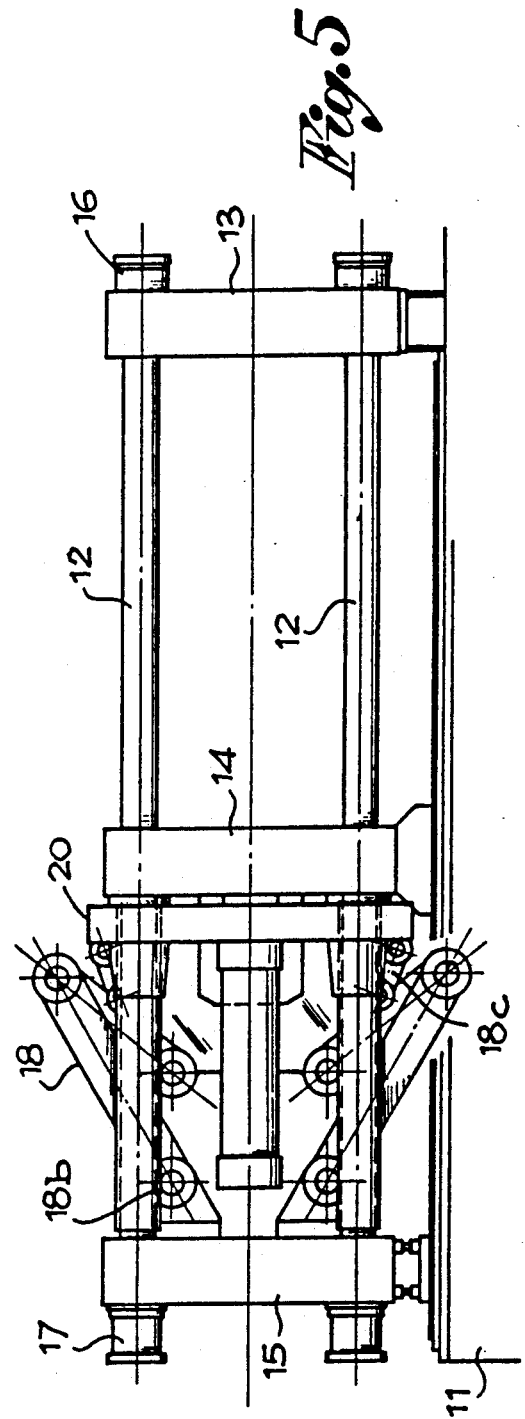

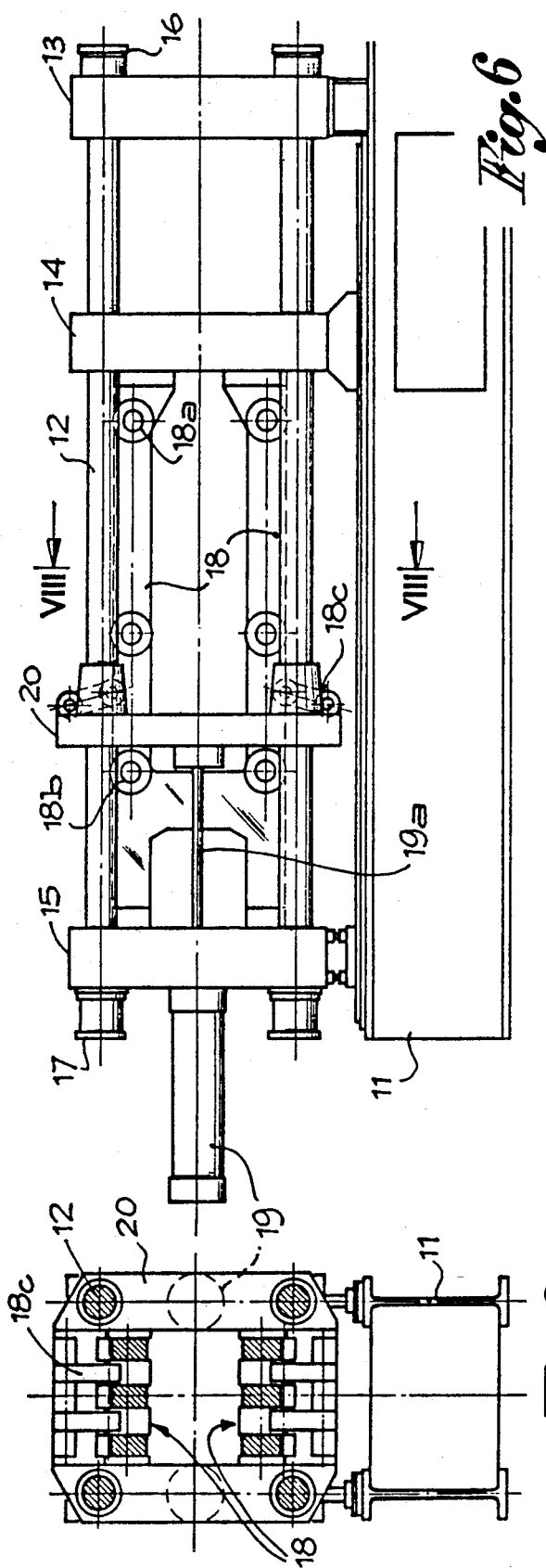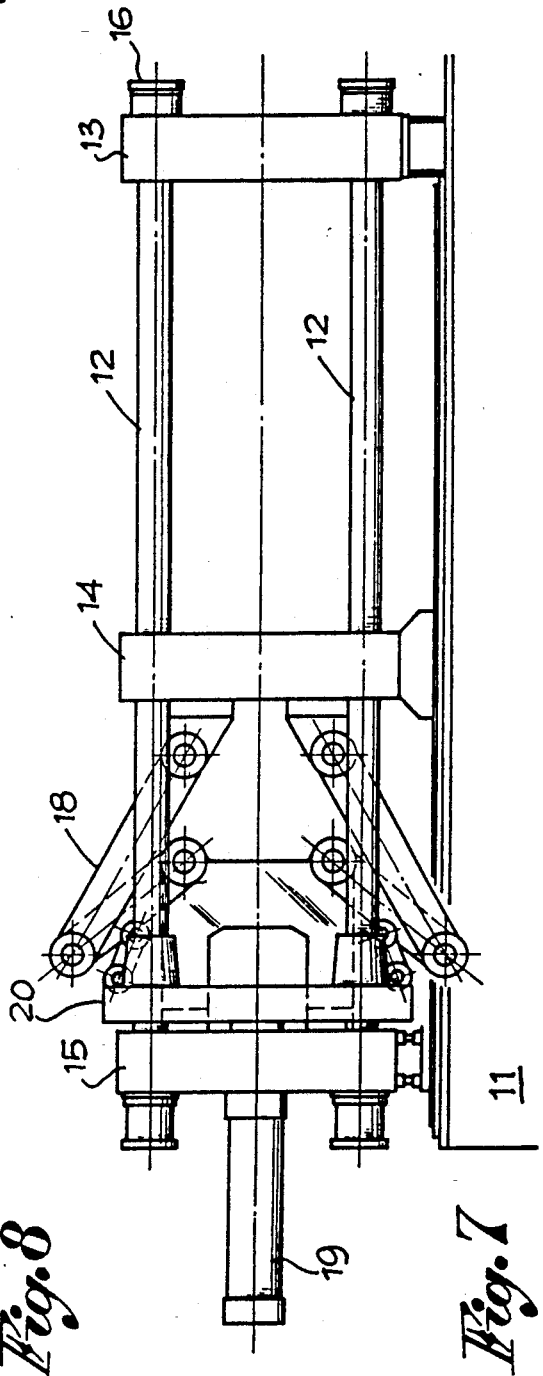

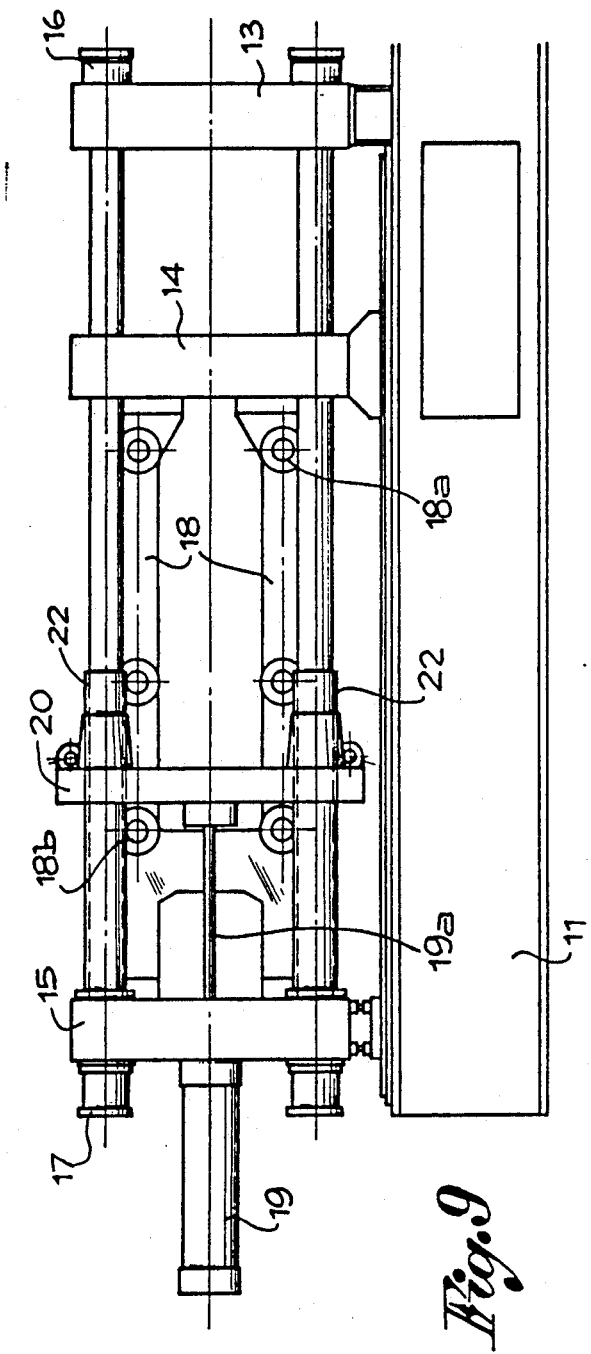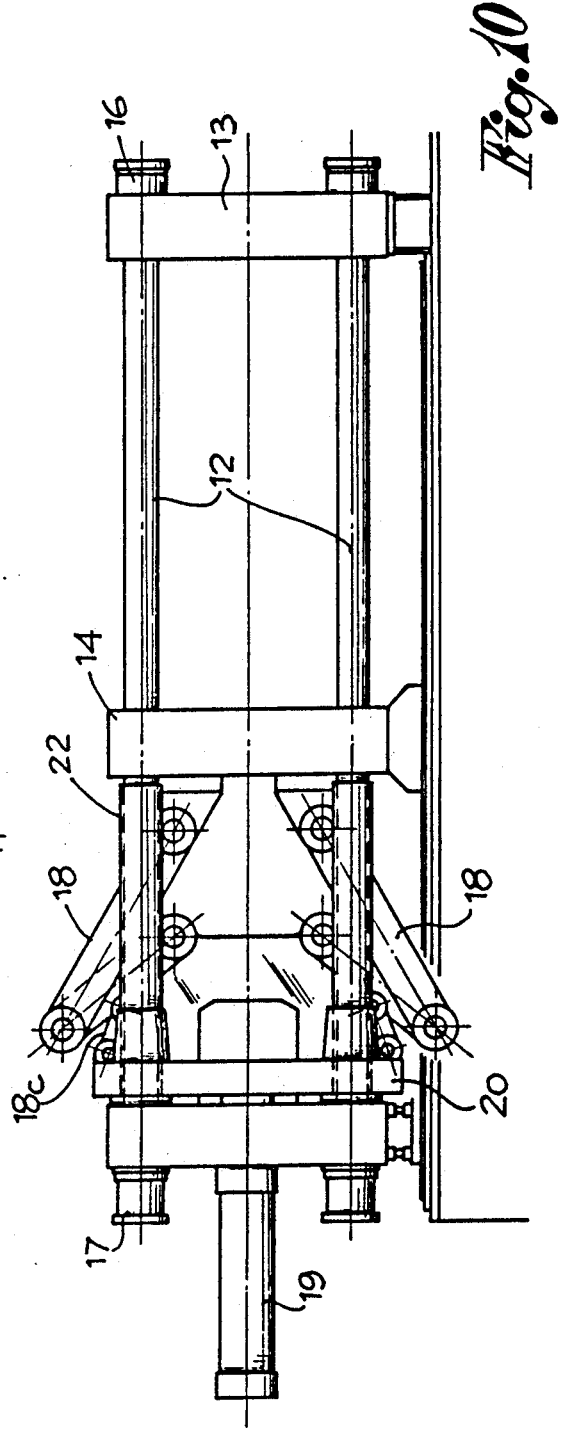

CLOSING UNIT FOR A DOUBLE TOGGLE MOLDING APPARATUS AND METHOD

The present invention pertains, in general, to machines for the injection molding of plastic materials or for double-toggle die casting, and more specifically, to a closing unit for the die in said machines.

Machines for injection molding or for die casting usually comprise a base, four horizontal columns placed above the base according to the vertices of a quadrilateral and passing in a stationary die-holder plate, attached on the base and resting against blocks applied to one end of the columns, in a movable die-holder plate guided on the base and led along the horizontal columns towards and away from the attached die-holder plate, and in a closing or reaction plate positionable on the base and resting against reaction blocks applied to the other end of the columns.

In such machines thus structured, the shifts of locking/unlocking in closing the movable die-holder plate against the stationary die-holder plate are realized by means of a common, so-called double-toggle device, using those of the rods and hinged connecting rods which are extended and withdrawn when operated by at least one hydraulic cylinder. According to a known design, the toggles are normally withdrawn towards the axis of the machine, are connected to a movable crosshead plate, and this is led on a pair of additional guide columns placed in parallel between the horizontal columns of the machine.

However, it is evident that the presence of a crosshead plate and of additional columns for guiding it complicate the structure of the machine, obstruct a convenient access to the inside of the structure for maintenance or anything else, and having a negative influence on its production costs.

The present invention aims to eliminate these disadvantages and to provide a machine for injection molding or for die casting which has a very simple and open structure, is very easy to access and is very economical.

In fact, the principal purpose of the present invention is that of providing a machine in which the movable element, to which the toggles are connected, is guided on the machine's own horizontal columns, thus eliminating the additional guide columns present in the known toggle machines.

Another purpose of the invention is to provide a machine of the above-mentioned type in which the toggles at the opening of the machine are withdrawn towards the outside, the movable part to which they are connected may be guided on horizontal columns directly or through interposed elements, and control cylinders may be applied to the movable part or to the reaction plate of the machine.

BRIEF DESCRIPTION OF THE DRAWINGS

In any case, the exemplified embodiments of the invention will be made more evident by the description below with reference to the attached drawings in which:

FIG. 4 shows a machine in the closing position as that in FIG. 1, but in which the movable part is led on the horizontal columns indirectly;

FIG. 5 shows a view of the machine in FIG. 4, but in the opening position;

FIG. 6 shows a machine as in FIG. 1 in the opening position, but with toggles placed between the movable part and the movable die-holder plate and control cylinders mounted on the reaction plate;

FIG. 7 shows a view of the machine in FIG. 6, but in the opening position;

FIG. 8 shows a cross section according to the arrows VIII-VIII in FIG. 6;

FIG. 9 shows a machine in the closing position as that in FIG. 6, but with the movable part led on the horizontal columns indirectly; and FIG. 10 shows a view of the machine in FIG. 9, but in the opening position.

DETAILED DESCRIPTION OF THE PREFERRED EMBODIMENT

Figure 3:
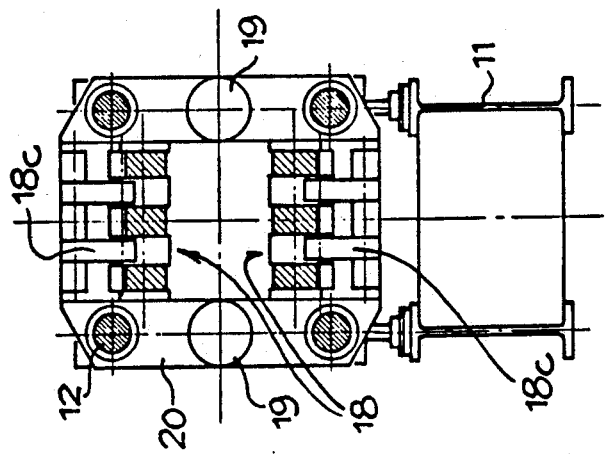
FIG. 3 shows a cross section according to the arrows III—III in FIG. 1.

In the known manner, a machine for molding plastic materials or for die casting comprises a base 11 above which are horizontally extended four columns 12 displaced according to the vertices of a quadrilateral and passing in a stationary die-holder plate 13, in a movable die-holder plate 14 and in a closing or reaction plate 15, spaced apart in a parallel. The stationary die-holder plate 13 is attached on the base and rests against blocks 16 applied to the adjacent end of the columns 12. The movable die-holder plate 14 is shiftable on the base and along the columns 12 towards and away from the stationary plate for the closing/opening of the die. The closing plate 15 is positionable on the base and rests against reaction blocks 17 applied to the other end of the columns 12.

For the shifts of closing/opening of the movable die-holder plate 14 are provided toggle mechanisms 18 controlled by a pair of hydraulic cylinders 19 by means of a movable part 20 to which the toggles 18 are connected.

Figure 1:
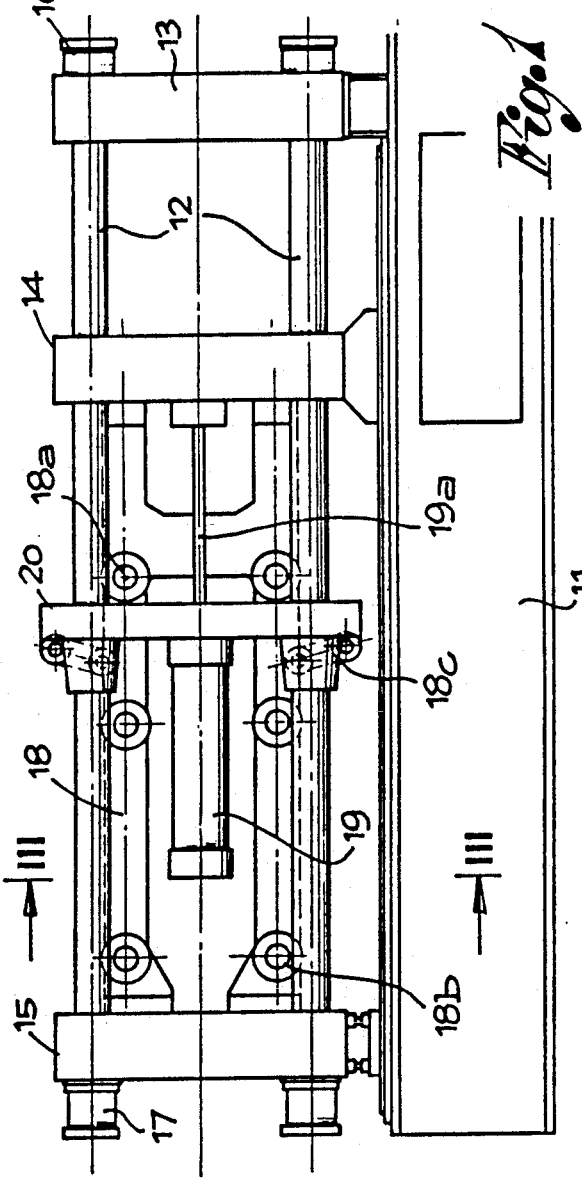
FIG. 1 shows a machine in the closing position and in which the movable part is led directly on horizontal columns, and the hydraulic cylinders are on the edge of said part.

Very precisely and in accordance with the present invention, the movable part is essentially in the form of a control ring 20—FIGS. 1 and 6—placed and shiftable in parallel between the movable die-holder plate 14 and the closing plate 15 and crossed by the four horizontal columns 12 of the machine.

Figure 2:
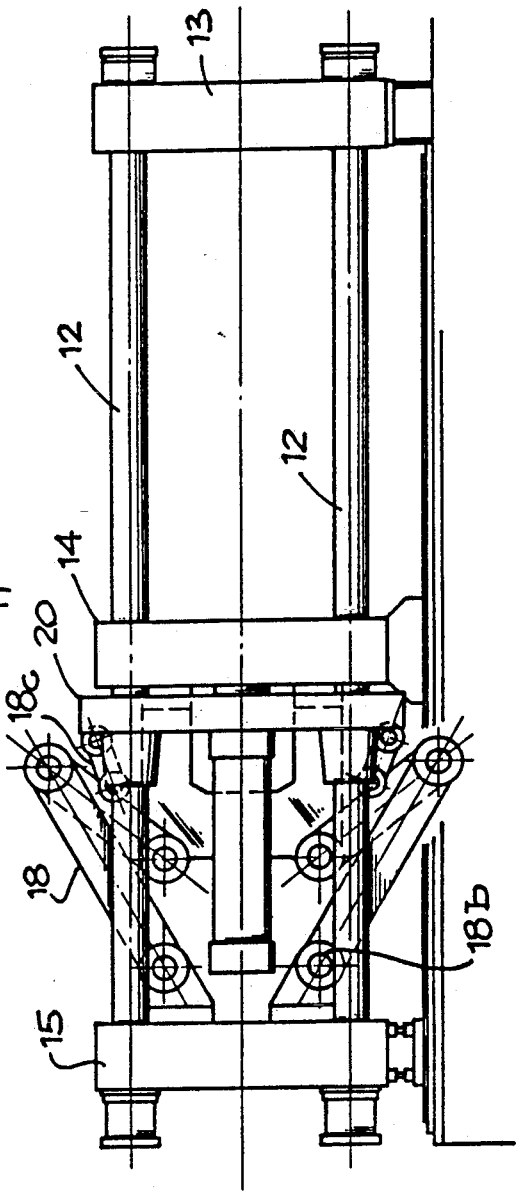
FIG. 2 shows a view similar to that in FIG. 1, but in the opening position.

In the machine example shown in FIGS. 1, 2 and 3, the control ring 20 is guided and directly shiftable along the columns 12, and each toggle 18, on the one hand, is hinged, in 18a, to the movable die-holder plate 14, and on the other hand, is hinged, in 18b, to the closing or reaction plate 15, and in the intermediate part, is connected to the control ring 20 by means of a connecting rod 18c. The control hydraulic cylinders 19 are attached to two opposite sides of said ring 20, and their shafts 19a are connected to the movable die-holder plate 14.

The machine shown in FIGS. 4 and 15 is completely identical to that shown in FIGS. 1-3, with the only difference that the control ring 20 is not guided directly on the columns 12, but on sliding sleeves 21 fixed, and therefore movable, with the movable die-holder plate 14 and extending part of the length of the columns 12 towards the closing plate 15.

In both embodiments, the action of the hydraulic cylinders 19 determines a shift either in closing or in opening the movable die-holder plate, and likewise, the shifts are also limited by the control ring 20 for extending the toggle mechanisms 18 for locking in the closing position and withdrawing them in the opening position. In particular, in opening, the control ring recedes somewhat; the toggles 18, moved by the connecting rod 18c, withdraw, turning towards the outside of the machine from the side of the movable plate 14, between this and the closing plate; the movable plate 14 approaches the control ring 20—FIGS. 2 and 5.

In practice, the stroke of the control ring 20 along the columns 12 or their sliding sleeves 21 is somewhat brief with respect to that of the movable die-holder plate 14 by closing and opening, the control hydraulic cylinders being on the edge of said ring.

In the machine example shown in FIGS. 6, 7 and 8, the control ring 20 is guided directly along the columns 12 as in FIG. 1, but unlike this one, the control hydraulic cylinders 19 are attached to the closing or reaction plate with their shaft 19a connected to said ring, while the toggle mechanisms, in opening, withdraw, turning towards the outside of the machine from the side of said closing plate and in the circle comprised between the ring 20 and the movable die-holder plate.

The machine shown in FIGS. 9 and 10 is completely identical to that shown in FIGS. 6–8, with the only difference that the control ring 20 is guided on sliding sleeves 22 attached to the closing or reaction plate 15 and extending part of the length of the columns 12 towards the movable die-holder plate 14.

In this embodiment with the toggles in reversed position with respect to the executions in FIGS. 1–5 in the opening and closing phases, the control ring has a very extended stroke, the cylinders always remain attached to the closing plate, and the movable die-holder plate never strictly approaches said ring given the inter-position of the toggles.

I claim:

1. A method of opening and closing a molding machine, the method comprising the steps of:
   providing a stationary die-holder;
   providing a plurality of columns attached at one end to said stationary die-holder;
   providing a closing plate attached to another end of said plurality of columns;
   providing a movable die-holder being slidable on said plurality of columns;
   providing a toggle mechanism connected to said closing plate and said movable die-holder;
   providing a control ring positioned between said closing plate and said movable die-holder and being slidable on said plurality of columns;
   providing a connecting rod pivotably attached to said control ring and said toggle mechanism; and
   forcing said control ring toward and away from one of said movable die-holder and said closing plate to move said movable die-holder between said opening position and said closing position, thereby opening and closing the molding machine.

2. A method in accordance with claim 1, wherein:
said forcing is between said control ring and said movable die-holder.

3. A method in accordance with claim 1, wherein:
said forcing is between said control ring and said stationary die-holder.

4. A closing apparatus for a molding machine, the apparatus comprising:
   a base;
   a stationary die-holder positioned on said base;
   a closing plate positioned on said base and spaced from said stationary die-holder;
   a plurality of columns attached to said stationary die-holder and said closing plate;
   a movable die-holder positioned between said stationary die-holder and said closing plate, said movable die-holder being on said plurality of columns;
   a toggle mechanism connected to said movable die-holder;
   a control ring positioned between said closing plate and said movable die-holder and being slidable on said plurality of columns, said control ring defining a substantially center opening;
   a connecting rod pivotably attached to said control ring and said toggle mechanism; and
   a hydraulic means for applying force against said movable die-holder and said closing plate, and for moving said movable die-holder between a locking position and an unlocking position, portions of said toggle mechanism and said movable die plate moving through said substantially center opening of said control ring during said moving of said movable die-holder.

5. An apparatus in accordance with claim 4, wherein:
each of said plurality of columns is attached to both said stationary die-holder and said closing plate; and
said each of said plurality of columns passes through said movable die-holder and said control ring, said movable die-holder and said control ring are slidable on said each of said columns.

6. An apparatus in accordance with claim 4, wherein:
said plurality of columns contains four (4) columns positioned in a substantially quadrilateral shape and said four columns are horizontal.

7. An apparatus in accordance with claim 4, further comprising:
another toggle mechanism connected to said closing plate and said movable die-holder, said toggle mechanism and said another toggle mechanism being on substantially opposite sides of said hydraulic means and between said movable die-holder and said closing plate.

8. An apparatus in accordance with claim 7, wherein:
said control ring defines a substantially center opening and portions of said another toggle mechanism and said closing plate move through said substantially center opening during said moving of said movable die-holder.

9. An apparatus in accordance with claim 4, wherein:
said connecting rod turns said toggle mechanism outside of said plurality of columns when said movable die holder moves away from said stationary die holder.

10. A closing apparatus for a molding machine, the apparatus comprising:
   a stationary die-holder;
   a plurality of columns having one end attached to said stationary die-holder;
   a closing plate attached to another end of said plurality of columns;
   a movable die-holder being slidable on said plurality of columns;
   a toggle mechanism connected to said closing plate and said movable die-holder;
   a control ring positioned between said closing plate and said movable die-holder and being slidable on said plurality of columns;

connecting rod means including a connecting rod and pivot points connecting said connecting rod to said control ring and to said toggle mechanism for moving portions of said toggle mechanism away from a longitudinal axis of the molding machine when said movable die-holder moves away from said stationary die-holder; and a hydraulic means for forcing said control ring toward and away from one of said movable die holder and said closing plate to move said movable die-holder toward and away from said stationary die holder.

11. A closing apparatus in accordance with claim 10, wherein:

said connecting rod inwardly extends from said pivot point on said control ring towards said longitudinal axis to said pivot point on said toggle mechanism when the molding machine is in a closing position.

12. An apparatus in accordance with claim 10, further comprising:

sliding sleeves around each of said plurality of columns, each of said sliding sleeves being connected to said movable die-holder and sliding on said plurality of columns, said sliding sleeves passing between said plurality of columns and said control ring, said control ring sliding on said sliding sleeves.

13. An apparatus in accordance with claim 10, further comprising:

sliding sleeves around each of said plurality of columns, each of said sliding sleeves being connected to said closing plate, said sliding sleeves passing between said plurality of columns and said control ring, said control ring sliding on said sliding sleeves.

14. An apparatus in accordance with claim 10, wherein:

said toggle mechanism is a double-toggle having a first toggle rod and a second toggle rod, said first toggle rod being pivotably attached at an end to said closing plate and attached at another end to said second toggle rod, said second toggle rod being pivotably attached at an end to said movable die-holder and being pivotably attached at another end to said first toggle rod.

15. An apparatus in accordance with claim 14, wherein:

said connecting rod is pivotably attached to said second toggle rod at a pivot point spaced from said end and said another end of second toggle rod; and said hydraulic means has a hydraulic cylinder positioned on said control ring and a hydraulic shaft positioned on said movable die-holder.

16. An apparatus in accordance with claim 14, wherein:

said connecting rod is pivotably attached to said first toggle rod at a pivot point spaced from said end and said another end of said first toggle rod; and said hydraulic means has a hydraulic cylinder positioned on said closing plate and a hydraulic shaft positioned on said control ring.

17. An apparatus in accordance with claim 14, wherein:

said connecting rod turns said another end of said first toggle rod and said another end of said second toggle rod away from a longitudinal axis of the molding machine during movement of said movable die-holder away from said stationary die-holder.

* * * * *

(12) EX PARTE REEXAMINATION CERTIFICATE (5286th)
United States Patent
Bugatti

(10) Number: US 5,252,286 C1
(45) Certificate Issued: Mar. 7, 2006

(54) CLOSING UNIT FOR A DOUBLE TOGGLE MOLDING APPARATUS AND METHOD

(75) Inventor: Egidio Bugatti, Brescia (IT)

(73) Assignee: B.M.B. S.p.A., Brescia (IT)

Reexamination Request:
No. 90/007,316, Nov. 23, 2004

Reexamination Certificate for:
Patent No.: 5,252,286
Issued: Oct. 12, 1993
Appl. No.: 07/828,389
Filed: Jan. 30, 1992

(30) Foreign Application Priority Data

Apr. 22, 1991 (IT) .................................. BS/91/A/000043

(51) Int. Cl.
  *B29C 45/66* (2006.01)

(52) U.S. Cl. ................................ 264/328.1; 425/451.6; 425/593

(58) Field of Classification Search ............... 425/450.1, 425/451.5, 451.6, 589, 592, 593; 264/328.1
See application file for complete search history.

(56) References Cited

U.S. PATENT DOCUMENTS 3,305,890 A    2/1967   Senior et al.

FOREIGN PATENT DOCUMENTS

TW    73554    1/1986

*Primary Examiner*—Mark Eashoo

(57) ABSTRACT

A machine for molding is equipped with a toggle mechanism for moving one of the die-holders. The movable die holder slides on columns. The columns are attached at one end to a stationary die-holder and at another end to a closing plate. The toggle mechanism is preferably a double toggle and connects the closing plate to the movable die-holder. A control ring also slides on the columns and is connected to the toggle mechanism by connecting rods. A hydraulic actuator is used to apply force to the movable die-holder to move it towards and away from the stationary die-holder. The control ring and the connecting rods are designed so that the toggle mechanism extends outside the columns during movement of the movable die-holder away from the stationary die-holder.

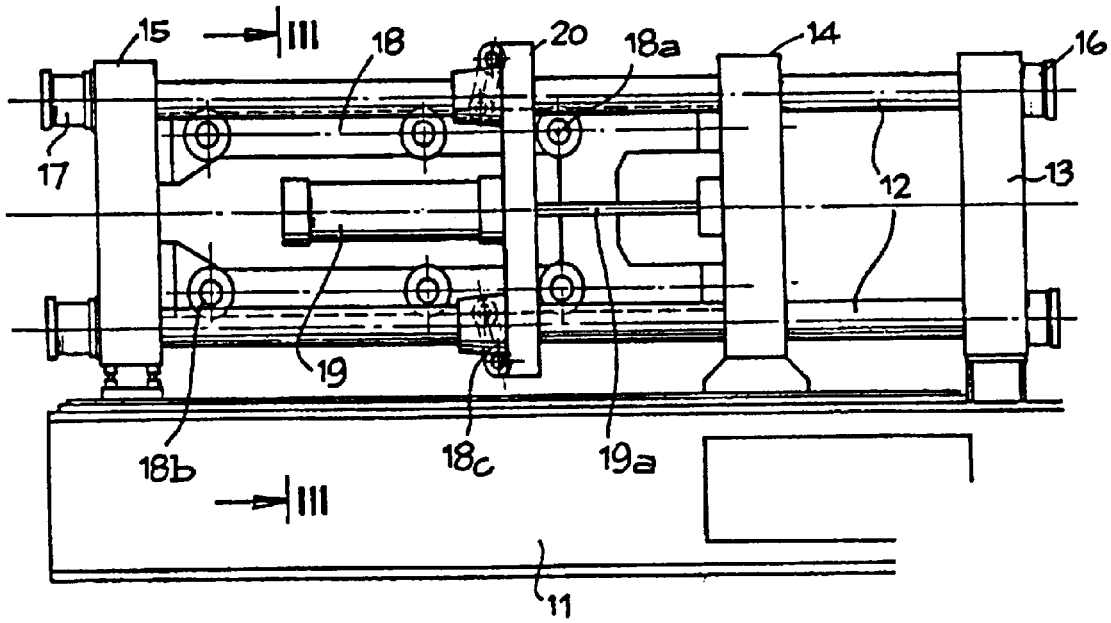

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–17 is confirmed.

* * * * *